United States Patent [19]
Lenhart et al.

[11] Patent Number: 5,939,864
[45] Date of Patent: Aug. 17, 1999

[54] LITHIUM-ION BATTERY CHARGE CONTROL METHOD

[75] Inventors: Stephen J. Lenhart, Mountain View; Rebecca R. Chang, Fremont, both of Calif.

[73] Assignee: Space Systems/Loral, Inc., Palo Alto, Calif.

[21] Appl. No.: 09/181,519

[22] Filed: Oct. 28, 1998

[51] Int. Cl.$^6$ ........................................................ H02J 7/00
[52] U.S. Cl. .............................. 320/137; 320/150; 429/50
[58] Field of Search ................................. 320/150, 137; 429/61, 49, 50

[56] References Cited

U.S. PATENT DOCUMENTS

| | | | |
|---|---|---|---|
| 4,324,845 | 4/1982 | Stockel | 429/101 |
| 4,567,119 | 1/1986 | Lim | 429/59 |
| 4,680,241 | 7/1987 | Dyer | 429/49 |
| 5,215,834 | 6/1993 | Reher et al. | 429/62 |
| 5,229,702 | 7/1993 | Boehling et al. | 320/2 |
| 5,395,706 | 3/1995 | Hall | 429/50 |

FOREIGN PATENT DOCUMENTS

| | | |
|---|---|---|
| 0 043 634 | 1/1982 | European Pat. Off. . |
| 0043634 | 1/1982 | European Pat. Off. . |

OTHER PUBLICATIONS

Proceedings of the 27$^{th}$ Intersociety Energy Conversion Engineering Conference, vol. 1, P–259, Aug. 3, 1992, San Diego, "Study of Nickel Hydrogen Battery Discharge Performance After Charge and Stand at Warm Temperature", S.W. Donley and D.C. Verrier.

National Semiconductor News Release: Industry's First Lithium Ion Battery Charge Controller, Apr. 12, 1996, 2 pages.

National Semiconductor Document, "LM3420 Handles Charging, End–of–Charge Control for Li–Ion Batteries" undated but publicly transmitted on May 20, 1997, 1 page.

EDN Magazine, "Proper handling helps make the most of Li–Ion batteries", Dec. 5, 1996, pp. 179–190.

Patent Abstracts of Japan, vol. 017, No. 535 (E–1439), Sep. 27, 1993, Publ. No. JP5151990, Jun. 18, 1993, Matsushita Electric Ind. Co.

Patent Abstracts of Japan, vol. 015, No. 147 (E–1055) Apr. 12, 1991, Publ. No. JP3022365, Jan. 30, 1991, Matsushita Electric Ind. Co.

*Primary Examiner*—Peter S. Wong
*Assistant Examiner*—Gregory J. Toatley, Jr.
*Attorney, Agent, or Firm*—Perman & Green, LLP

[57] ABSTRACT

A technique of operating a lithium-ion (Li-ion) battery is proposed for maximizing battery life. In a first instance, this technique calls for charging the battery at a lower temperature than the temperature at which discharge begins. Preferably, the battery is charged at a temperature $T_1$ in the range between about +5° C. and –20° C.; and discharged at a temperature $T_2$, in the range of about +5° C. to +30° C., $T_2$ being higher than $T_1$. In another instance proposed by the invention, the battery is charged to an elevated state of charge which is above an initial state of charge at a temperature $T_1$ between about +5° C. and –20° C. which is lower than a temperature $T_2$, in the range of about +5° C. to +30° C., at which discharge begins. In still another instance proposed by the invention, after the battery has been charged and discharged during the eclipse season, it is then charged to an intermediate charge level between about 40% and about 60% state of charge over a relatively long lapsed duration of time, about one month to about six months, and thereafter, the battery is maintained at this intermediate charge level.

10 Claims, 1 Drawing Sheet

LITHIUM-ION BATTERY CHARGE CONTROL METHOD

BACKGROUND OF THE INVENTION

1. Field of the Invention

The present invention relates generally to lithium-ion batteries and, more particularly, to a method for extending the life of Lithium-Ion (Li-ion) batteries of the type used in spacecraft by optimizing the state-of-charge and battery temperature throughout the on-orbit battery charging period.

2. Description of the Prior Art

Lithium batteries have existed for years, mainly as primary (non-rechargeable) types in the form of small "coin" cells. Larger primary cells are considered hazardous materials and so are not widely available in the United States. Lithium is a very reactive element which is desirable for use in batteries but is dangerous because its reactivity makes it potentially flammable.

For normal shipping, the U.S. Department of Transportation limits the amount of lithium in a single cell to 1 g. Solid-electrolyte lithium cells (lithium-iodine and lithium-magnesium-dioxide types, for example) have high internal impedances. This limits their use to products like pacemakers and other low-current, long-life applications. Liquid-cathode lithium cells can be discharged at a higher rate, but these types are generally limited to memory-retention and battery-backup applications.

Rechargeable (secondary) lithium batteries appeared in the 1980s. These batteries use lithium metal as the negative electrode (the anode) and an "intercalation" positive electrode (the cathode). Intercalation refers to an electrochemical reaction in which ions bond to the cathode material. Because this reaction is reversible (de-intercalation), the battery can be made rechargeable.

When a rechargeable lithium battery discharges, the lithium metal gives off ions to the electrolyte, which is either a liquid or a solid polymer. These lithium ions migrate to the cathode and ionically bond with the material. The main problem with this battery type resides in dendrites—small fingers of lithium metal that form while the battery is charging. Dendrites increase the metal's surface area, producing a greater reactivity with the electrolyte. Thus, the battery becomes increasingly sensitive to abuse because the number of dendrites increases with each charge-discharge cycle.

To overcome the problems associated with lithium metal in batteries, researchers experimented with the use of intercalation materials for both the anode and cathode, producing a component known as the lithium-ion (Li-ion) battery. Lithium metal is not present; instead, positively charged lithium ions travel from cathode to anode during charge and from anode back to cathode during discharge. This back and forth ion flow during the charge and discharge cycles has led to the expressions of "swing" and "rocking-chair" batteries.

The use of intercalation electrodes not only eliminates the need for lithium metal, but also simplifies manufacturing because manufacturers can construct the battery at zero potential. The manufacturer can then charge the battery after assembly, thereby reducing the possibility of damage due to short circuits.

Lithium ion batteries are rapidly becoming the power source of choice for space applications. They exhibit high energy and power both per unit volume and per unit weight in comparison with NiCd, nickel-metal hydride (NiMH), and other rechargeable types.

Because of one of their unique operating characteristics, lithium ion battery cells require careful charge management to ensure that significant over charge and over discharge does not occur. This is for the reason that lithium ion batteries possess an extreme sensitivity to overcharging and over-discharging not found in most other types of batteries. Such charge management may be achieved by limiting the maximum voltage to which the cell is charged. In order to achieve the maximum possible energy stored in the cell while limiting the over charge and over discharge, a device is required that controls the voltage. Also, in many applications, if a cell opens, then the whole battery would be lost. It is desirable to allow the cell to be completely bypassed if it fails in this manner. The ability to monitor temperature and adjust the maximum charge voltage accordingly is also desirable. A feature to allow varying the charge voltage set point from outside the device is also desired.

Lithium-Ion batteries are normally charged at constant current to the end-of-charge voltage limit in some cases (i.e. the two-step charge method), the charging current is then stepped to a lower value, and charging is resumed until the battery returns to the end-of-charge voltage limit. This is sometimes referred to as the constant current-constant current method. Alternately after reaching the cut-off limit, the battery can be held at the end-of-charge voltage while the current decreases as needed to maintain the constant voltage. This is sometimes referred to as the constant current-constant voltage method. Battery charging and discharging normally occurs at a nominal design temperature with no attempt to control or adjust battery temperatures during the charge/discharge process.

The present invention relates to optimizing battery charging and discharging temperatures, specifically, cold charging in the range of about +5° C. to −20° C. and warm discharging in the range of about +5° C. to +30° C. Also proposed is the technique of partially charging the battery and then waiting as long as possible before completing the charge in order to minimize the time at high battery voltage.

Of interest in this regard is commonly assigned U.S. Pat. No. 5,395,706 issued Mar. 7, 1995 to John C. Hall. The Hall patent discloses a method of operating a nickel-hydrogen battery in a manner which serves to increase its charge capacity. That method comprises the step of completing the recharging process for the battery at a temperature $T_1$, in the range of approximately −10° C. down to −30° C. which is lower than a temperature $T_2$, in the range of approximately −10° C. to +5° C., at which discharge customarily begins. At the onset of the recharge operation the temperature may be in the range of +25° C. to +40° C. However, as recharge proceeds, the temperature is caused to fall to the range of −10° C. to −30° C. which is optimum for full recharge. The temperature $T_1$ is chosen to maximize the extent of the reaction represented by the equation:

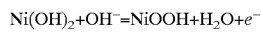

versus the reaction represented by the equation:

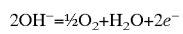

Subsequently, as recited in the patent, it is desirable to heat the battery to the temperature $T_2$ in readiness for discharge. A preferred recharge temperature is less than approximately −10° C. The battery includes a positive electrode which may include electrochemically active $Ni(OH)_2$ (possibly mixed with $Co(OH)_2$) and electrically conductive material having a resistivity less than approximately 0.1 ohm-cm, a negative electrode which is of a material which catalyzes the oxidation and reduction of $H_2$, and an electrolyte which is a solution of KOH (typically 20% to 40% by weight).

It was with knowledge of the foregoing state of the technology that the present invention has been conceived and is now reduced to practice.

SUMMARY OF THE INVENTION

The present invention relates to a technique of operating a lithium-ion (Li-ion) battery for maximizing battery life. In a first instance, this technique calls for charging the battery at a lower temperature than the temperature at which discharge begins. Preferably, the battery is charged at a temperature $T_1$ in the range between about +5° C. and −20° C.; and discharged at a temperature $T_2$, in the range of about +5° C. to +30° C., $T_2$ being higher than $T_1$. In another instance proposed by the invention, the battery is charged to an elevated state of charge which is above an initial state of charge at a temperature $T_1$ between about +5° C. and −20° C. which is lower than a temperature $T_2$, in the range of about +5° C. to +30° C., at which discharge begins. In still another instance proposed by the invention, after the battery has been charged, then discharged during the eclipse season, it is then charged to an intermediate charge level between about 40% and about 60% state of charge over a relatively long lapsed duration of time. The relatively short lapsed duration of time, about one month to about six months, and the battery is maintained at this intermediate charge level for this period of time.

One part of this invention, then, is to charge the battery at a lower temperature than the discharge temperature. Charge acceptance rates are strongly temperature dependent, but since the spacecraft battery charging current is normally lower than the discharge current, a fill state of charge can still be attained at the lower charging temperature. Discharge capacities are higher at elevated temperatures and we are proposing to heat the battery prior to discharge.

Another part of the invention is to partially charge the battery following an eclipse season discharge and then wait as long as possible before completing the charge. The partially charged battery can still provide enough energy to support the spacecraft if a spacecraft upset occurs. The total time at high battery voltage is minimized for each charging cycle and the calendar and cycle life of the battery is extended.

Thus, a primary feature of the present invention is providing a technique for operating lithium-ion batteries and, more particularly, to a method for extending the life of Lithium-Ion (Li-ion) batteries of the type used in spacecraft by optimizing the state-of-charge and battery temperature throughout the on-orbit battery charging period.

Another feature of the present invention is providing such a technique according to which the battery is charged at a lower temperature than the discharge temperature.

Still another feature of the present invention is providing such a technique according to which the battery is heated prior to discharge.

Yet another feature of the present invention is providing such a technique according to which the battery is partially charged following an eclipse season discharge after which completion of the charging process is delayed as long as possible while the battery retains sufficient energy to support the spacecraft if a spacecraft upset occurs.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Most battery and battery charger designs and most battery applications require or desire rapid (high current) battery charging. Warm temperatures (30° to 60° C.) are better for rapid Li-ion battery charging and most battery applications (excepting electric vehicles) have no requirements or need to charge at low temperatures (i.e. less than ambient temperature). In lithium-ion cells, allowable charging rates are faster at warmer temperatures. In a geosynchronous spacecraft during an eclipse season, there is no need to charge rapidly because the spacecraft battery discharge occurs only once per day for a maximum discharge time of 72 minutes (or 1.2 hours). Charging can take as long as 22.8 hours and there is generally no need to charge at a faster rate. In fact, if the battery is charged faster than is required, the solar arrays must deliver more current or power during the charging period than is otherwise required. This would result in the requirement that the solar array be larger, heavier and more expensive than otherwise called for.

Figure 1:
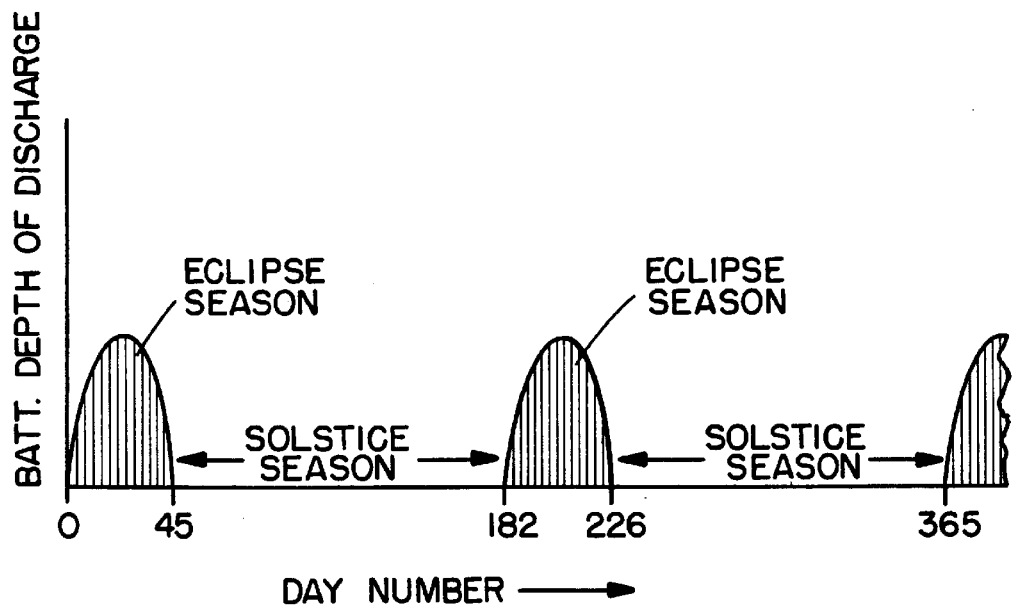
FIG. 1 is a graph presenting the battery depth of charge over the course of a year and specifically depicting the eclipse seasons and their intervening solstice seasons.
Figure 2:
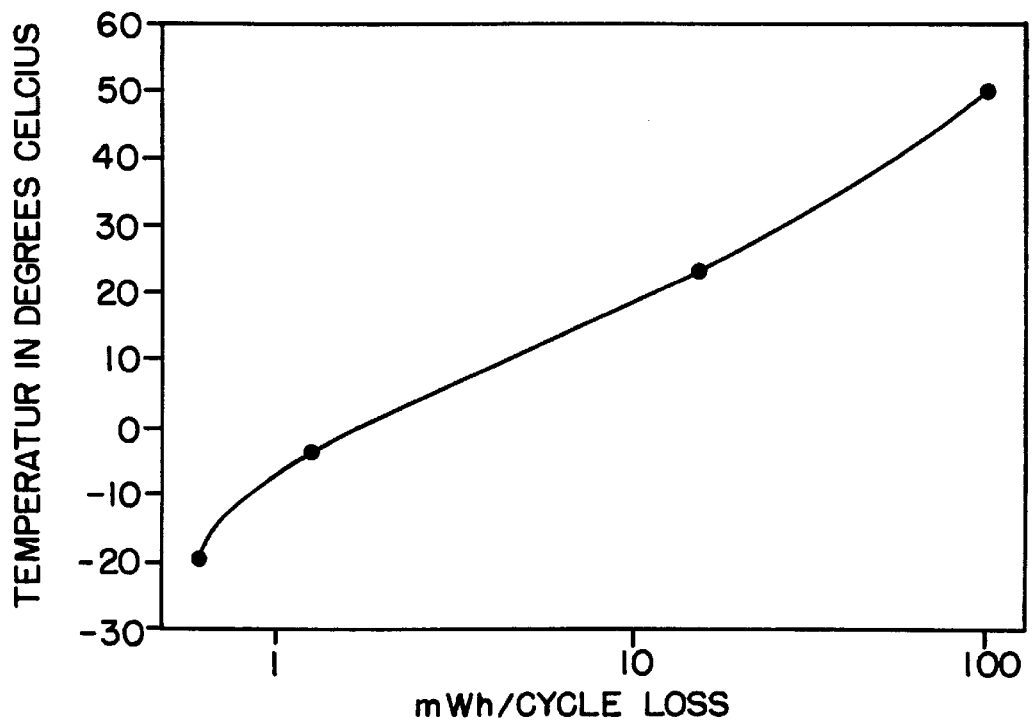
FIG. 2 is a graph depicting the general effect of temperature on battery capacity loss.

The present invention actually flies in the face of this generally accepted norm of operation. Specifically, the present invention actually calls for charging at low temperatures to prolong battery life, even though charging is to be performed slowly because of the slow recharge kinetics. If a battery is kept warm for too long a period or continuously, the effect observed in FIG. 2 will occur, namely, the battery will experience irreversible loss of capacity as a direct result of the elevated temperature. As can be seen from FIG. 2, capacity loss is less at lower temperatures than at higher temperatures.

Furthermore, as noted above, according to the present invention, it is undesirable to recharge quickly or even completely. Rather, it is desirable to recharge to about 40% to about 80% state of charge immediately following an eclipse discharge, but then to stop charging for about 10 hours or so. Then, charging is completed during the last few hours before the next eclipse to minimize the time at a high state of charge (i.e. high voltage) when life shortening parasitic reactions occur. However, it is desirable to warm the battery just before an eclipse discharge in order to speed up the discharge kinetics to provide full battery capacity. In a solstice period between the eclipse seasons, it is again desirable to maintain the battery at about 40% to about 80% state of charge to minimize exposure time at a high state of charge.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of operating a lithium-ion (Li-ion) battery so as to maximize battery life comprising the step of:
   (a) charging the battery at a lower temperature than the temperature at which discharge begins.

2. The method of operating a lithium-ion (Li-ion) battery as set forth in claim 1
   wherein step (a) includes the steps of:
   (b) charging the battery at a temperature $T_1$ in the range between about +5° C. and −20° C.; and
   (c) discharging the battery at a temperature $T_2$, in the range of about +5° C. to +30° C., which is higher than $T_1$.

3. The method of operating a lithium-ion (Li-ion) battery as set forth in claim 2 including the step, prior to performing step (c), of:
   (d) heating the battery prior to the onset of step (c).

4. The method of operating a lithium-ion (Li-ion) battery as set forth in claim 2 including the step, prior to performing step (c), of:
   (d) heating the battery to the temperature $T_2$ prior to the onset of step (c).

5. A method of operating a lithium-ion (Li-ion) battery so as to maximize battery life, the battery being less than fully charged, the method comprising the step of:
   (a) reaching an elevated state of charge above a minimal state of charge at a temperature $T_1$ between about +5° C. and −20° C. which is lower than a temperature $T_2$, in the range of about +5° C. to +30° C. at which discharge begins.

6. A method of operating a lithium-ion (Li-ion) battery so as to maximize battery life, the battery being initially substantially discharged, the method comprising the step of:
   (a) partially charging the battery to a charge level between about 40% and about 60% state of charge; and
   (b) maintaining the battery at the charge level of step (a) for a relatively long elapsed duration of time.

7. A method of operating a lithium-ion (Li-ion) battery as set forth in claim 6
   (a) partially charging the battery to a charge level between about 40% and about 60% state of charge; and
   (b) maintaining the battery at the charge level of step (a) for the duration of the solstice season between successive eclipse seasons.

8. A method of operating a lithium-ion (Li-ion) battery as set forth in claim 6
   wherein the relatively long lapsed duration of time of step (a) is in the range of about one month to about six months.

9. A method of operating a lithium-ion (Li-ion) battery as set forth in claim 6
   wherein the relatively long lapsed duration of time of step (a) occurs twice a year.

10. A method of operating a lithium-ion (Li-ion) battery as set forth in claim 6
    wherein the battery is a component on a spacecraft; and
    wherein the charge level is of sufficient magnitude to provide adequate energy to support the spacecraft if a spacecraft upset occurs.

* * * * *